US010288422B2

(12) United States Patent
Uhl et al.

(10) Patent No.: US 10,288,422 B2
(45) Date of Patent: May 14, 2019

(54) MONITORING A SAFETY-RELEVANT PARAMETER OF A COORDINATE MEASURING DEVICE

(71) Applicant: CARL ZEISS INDUSTRIELLE MESSTECHNIK GMBH, Oberkochen (DE)

(72) Inventors: Peter Uhl, Unterschneidheim (DE); Günter Grupp, Böhmenkirch (DE); Rainer Sagemüller, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/766,291

(22) PCT Filed: Oct. 5, 2016

(86) PCT No.: PCT/EP2016/073728
§ 371 (c)(1),
(2) Date: Apr. 5, 2018

(87) PCT Pub. No.: WO2017/060268
PCT Pub. Date: Apr. 13, 2017

(65) Prior Publication Data
US 2018/0283858 A1 Oct. 4, 2018

(30) Foreign Application Priority Data
Oct. 5, 2015 (DE) .................. 10 2015 116 850

(51) Int. Cl.
*G01B 5/00* (2006.01)
*G01B 21/04* (2006.01)
*G01B 5/008* (2006.01)

(52) U.S. Cl.
CPC ........... *G01B 21/047* (2013.01); *G01B 5/008* (2013.01); *G01B 5/0016* (2013.01); *G01B 21/04* (2013.01)

(58) Field of Classification Search
CPC ...... G01B 21/04; G01B 21/047; G01B 5/008; G01B 7/008; G01G 9/00
(Continued)

(56) References Cited

U.S. PATENT DOCUMENTS

| 5,902,964 | A | * | 5/1999 | Solberg, Jr. et al. .... G01G 3/16 177/1 |
| 6,591,208 | B2 | | 7/2003 | Lotze et al. |
| 2008/0295349 | A1 | | 12/2008 | Uhl et al. |
| 2009/0026995 | A1 | | 1/2009 | Uhl et al. |
| 2012/0229662 | A1 | * | 9/2012 | Lankalapalli et al. ..................... G05B 19/409 348/211.8 |

FOREIGN PATENT DOCUMENTS

| DE | 10006876 | C1 | 6/2001 |
| DE | 10124493 | A1 | 11/2001 |

(Continued)

OTHER PUBLICATIONS

International Search Report (in English and German) issued in PCT/EP2016/073728, dated Dec. 6, 2016; ISA/EP (6 pages).
(Continued)

Primary Examiner — Jonathan M Dunlap
(74) Attorney, Agent, or Firm — Harness, Dickey & Pierce, P.L.C.

(57) ABSTRACT

A system and a method for reliably monitoring a parameter, in particular a moment of inertia, required for determining a kinetic energy of an object that can be measured by means of a sensor of a coordinate measuring machine. The object is moved between various positions, with the object preferably being at least briefly at rest in each of the approach positions. The method comprises the steps of: a) initially determining the parameter, and setting the initially determined parameter as target value; b) moving the object from
(Continued)

one position to a next position, and re-determining the parameter for a movement cycle between the corresponding positions; c) setting the re-determined parameter as an actual value; d) comparing the target value with the actual value; e) continuing the movement of the object if the comparison results in that the actual value substantially coincides with the target value, and returning to the step b) as long as a last position has not been reached; or f) outputting an error message if the comparison results in that the actual value deviates significantly from the target value.

13 Claims, 4 Drawing Sheets

(58) Field of Classification Search
USPC .................................................. 73/865, 865.3
See application file for complete search history.

(56) References Cited

FOREIGN PATENT DOCUMENTS

| DE | 102006003362 A1 | 7/2007 |
| DE | 102006009181 A1 | 9/2007 |

OTHER PUBLICATIONS

Written Opinion (in German) issued in PCT/EP2016/073728, dated Dec. 6, 2016; ISA/EP (5 pages).
International Preliminary Report of Patentability (Chapter II),with 13 page annex (in German) issued in PCT/EP2016/073728, dated Sep. 21, 2017; IPEA/EP (20 pages).
English Translation of International Preliminary Report of Patentability (Chapter II), (6 pages).

* cited by examiner

MONITORING A SAFETY-RELEVANT PARAMETER OF A COORDINATE MEASURING DEVICE

CROSS-REFERENCES TO RELATED APPLICATIONS

The present application is a national phase application under 35 USC § 371 of International PCT application PCT/EP2016/073728, filed Oct. 5, 2016, which claims priority to German application DE 10 2015 116 850.2, filed Oct. 5, 2015. The entire contents of these priority applications are incorporated herein by reference.

BACKGROUND OF THE INVENTION

The present invention relates to a coordinate measuring machine and a method for reliably monitoring a parameter, in particular a moment of inertia, or a mass, required for determining a kinetic energy of an object that can be measured by means of a sensor of a coordinate measuring machine, the object being moved between various positions, wherein the object preferably is briefly at rest in each of the positions.

Coordinate measuring machines are generally known. Coordinate measuring machines are used for measuring workpieces of greatly varying dimensions, and consequently of greatly varying masses, or mass moments of inertia. DE 101 24 493 A1 describes an exemplary coordinate measuring machine with a measuring head, which is movable in relation to a workpiece within a defined measurement volume. The measuring head is used for measuring measuring points defined on a workpiece. For this purpose, the workpiece is brought into a corresponding measuring position in relation to the measuring head. The measuring head often has a probe sensor, in particular in the form of a stylus with a spherical free end, with which the desired measuring points on the workpiece are physically contacted. Therefore, such a measuring head is often referred to as a probe head. Alternatively, there are measuring heads that can be used for contactlessly measuring defined measuring points on a workpiece, in particular with optical sensors.

A control and evaluation unit determines from the position of the measuring head within the measurement volume, and possibly from the position of the probe sensor in relation to the measuring head when probing the workpiece, spatial coordinates that represent the probed measuring point. If the spatial coordinates are determined at a plurality of measuring points, geometrical properties of the workpiece can be measured, such as the diameter of a bore or the spatial distance between two geometric elements of the workpiece. In addition, with a plurality of spatial coordinates it is possible to determine measurement curves that represent the spatial shape of individual geometric elements, or even the spatial shape of the entire workpiece. Often, geometrical dimensions such as the diameter of a bore or the distance between two geometric elements are determined for the first time on the basis of the measurement curves. This determination is equivalent to a scanning operation. Upon "scanning" measured values are adopted during a movement. The probe sensor is in this case in contact with the workpiece, which is thus probed.

Often, turntables are also used, with the workpieces mounted on a moved spindle rather than positioned on the fixed measuring table. During a rotation of the workpiece (and of the corresponding workpiece holder) a specific rotational energy of the rotated object is obtained in dependence on a speed of movement and a moment of inertia.

For safety reasons, such as personal protection, this energy must not exceed certain limit values. Machine guidelines prescribe, for example, an upper limit of 4 J, which must not be exceeded. Otherwise, in the event of a collision, there could be a serious risk of injury to an operator. There is a collision in case, for example, the workpiece and/or the workpiece holder touches or catches a limb of the operator during movement.

This causes the following problem. Since a mass, or a moment of inertia, of a workpiece to be measured is usually not known in advance, the worst, but intrinsically safe case, must be assumed. This means that a maximum speed at which the workpiece and/or the workpiece holder may be moved is fixed on the basis of the greatest possible movable mass, or based on a corresponding moment of inertia. This results in that lighter workpieces are moved unnecessarily slowly. Since many end users mostly measure lighter workpieces, a measuring capacity of the coordinate measuring machine is decreased considerably.

Providing light barriers around the measurement volume or using pressure mats can be seen as a known safety feature. If one of the light barriers is interrupted, present speed of movement is reduced to a safe level. Such solutions are expensive, since, depending on the type of coordinate measuring machine, barriers have to be provided on up to five sides of the machine. Furthermore, the working area of the coordinate measuring machine is increased unnecessarily, since the light barriers have to be installed at a predetermined distance from the workpiece in order that the workpiece can be slowed down before the operator reaches the workpiece after breaking through the light barriers. Furthermore, when using light barriers there is still a certain residual risk, since the operator can possibly also be "trapped" intentionally by the light barriers if, for example, the coordinate measuring machine is operated by two operators. Furthermore, safety devices such as light barriers or pressure mats are troublesome, because the coordinate measuring machine is continually changing its speed, which can have adverse effects on scanning operations.

It is also known to determine the mass automatically by means of pressurized air bearings, as disclosed, for example, in the document DE 100 06 876 C1.

Often, operating instructions of the coordinate measuring machines also contain tables or formulae that can be used for an initial approximate determination of the speed on the basis of a workpiece mass. With this safety concept, there is the problem of a foreseeable misuse or mistake since the moment of inertia is often unknown.

Therefore, it is an object of the present invention to provide a coordinate measuring machine method for reliably monitoring a parameter that represents a measure of the kinetic energy of the moved object.

SUMMARY OF THE INVENTION

This object is solved by a method for reliably monitoring a parameter, in particular a moment of inertia, or a mass, required for determining a kinetic energy of an object measurable by means of a sensor of a coordinate measuring machine, the object being moved between various positions, wherein the object preferably is at least briefly at rest in each of the positions, the method comprising the steps of: initially determining the parameter, and setting the initially determined parameter as target value; b) moving the object from one position to a next position, and re-determining the parameter for a movement cycle between the corresponding approach positions; c) setting the re-determined parameter as an actual value; d) comparing the target value with the actual value; e) continuing the movement of the object if the comparison results in that the actual value substantially coincides with the target value, and returning to the step b) as long as a last position has not been reached; or f) outputting an error message if the comparison results in that the actual value deviates significantly from the target value.

The parameter is continuously inquired, namely with each movement of the workpiece, or of the object. If the parameter changes with respect to an earlier setting, measures that ensure safety (at work) can be immediately taken, without having to provide elaborate, additional safety features, such as light barriers. The changing of the parameter may be brought about intentionally or unintentionally. An intentional change occurs if, for example, the operator performs a run with a lighter workpiece and later clamps a heavier workpiece in order to move the heavier workpiece at a greater speed than is permissible. An unintentional change could occur if a piece of the workpiece breaks away during a measurement. In this case, the mass of the workpiece is reduced, which can be brought to the attention of the operator but must not necessarily lead to the measurement being terminated, because, after all, the kinetic energy of the workpiece is reduced.

The coordinate measuring machine can be safely operated without additional sensors (for example, light arrays) by, for example, monitoring the motor current during a relative movement of the object and using it to calculate the mass moment of inertia. This is possible by means of the relationship M=J*α, wherein M denotes the torque with which the object (workpiece) and the rotationally movable components of the object support of the turntable (for example, the rotor, face plate, and work mounting or holder) are rotationally accelerated, wherein J denotes the corresponding moment of inertia of the object and of the movable components of the object support of the turntable, and wherein α denotes the corresponding angular acceleration. The motor current can be used to determine the torque M, and twice the derivative of the values of the angular encoder of the turntable can be used to determine the acceleration α, so that, as a result, the moment of inertia J can be determined. By analogy, for the translational case, the mass m of the object (workpiece) and of the movable components of the object support (for example, the moved measuring table and workpiece mounting) can be determined by means of the relationship F=m*a, wherein F is the force with which the object and the movable parts of the object support are accelerated, and a denotes the associated acceleration. The motor current can be used to determine the force F, while twice the time derivative of the scale values of the object support of the object can be used to determine the acceleration a.

In one embodiment the method also comprises the steps of: selecting a parameter range, which comprises an expected parameter value, by an operator of the coordinate measuring device from a plurality of parameter ranges before the step b) is carried out, an entirety of all the parameter ranges comprising each parameter value that is theoretically possible and permissible in practice, and the selecting step preferably being performed by actuating a selection switch of the coordinate measuring machine.

The selection and setting of a range in which the parameter is expected allows a second safety step. If, for example, the measured mass is less than the set expected mass, the measurement can nevertheless be continued even though the actual value does not correspond to the target value.

In another embodiment it is also checked whether the actual value is within the selected parameter range, and a further error message is output if the actual value is not within the selected parameter range.

In particular, the determining of the parameter of the steps a) and/or b) comprises: measuring a drive current, or a drive force, during at least one of the acceleration phases of the movement cycle, the movement cycle comprising a phase with a positive acceleration and a phase with a negative acceleration; and determining the parameter on the basis of the measured drive current, or on the basis of the measured drive force.

Sensors for determining the drive current and/or the drive force may already be present in a standard configuration of conventional coordinate measuring machines, so that the safety-relevant parameter can be determined on the basis of a measured value that can be determined without additional sensors. The method of the invention can therefore be carried out with conventional coordinate measuring machines without making any serious modifications. The costs and measures for making the coordinate measuring machine safer are reasonable.

It is also of advantage if the drive current, or the drive force, for each of the acceleration phases of the movement cycle is measured, in particular if the acceleration phases are of such a short time that the respective parameter determination would be inaccurate, for example, because of overshoots, with the parameter determination being performed for each of the acceleration phases, with the respectively determined parameter subsequently being averaged, and with the corresponding average value representing the entire respective movement cycle.

Averaging increases the accuracy of the parameter determination. Redundant information that is present in any case is taken into account. Overshoots are less important, or can be balanced out.

In particular, the drive current, or the drive force, for each of the acceleration phases of the movement cycle is measured, in particular if the acceleration phases are of such a sufficiently long time that overshoots are not considered in the parameter determination, with the parameter determination being performed for each of the acceleration phases and the parameters that are respectively determined for the acceleration phases being compared with one another.

This procedure allows a plausibility check within a measurement, or movement, cycle. It can be checked whether the relevant sensors (for example, the current measuring devices) are operating correctly.

In still another embodiment the step a) is carried out by an operator inputting the target value into the coordinate measuring machine.

Preferably, the error message causes: an emergency shutdown of the coordinate measuring machine; an immediate termination of a current movement of the object; a reduction of a speed of movement; and/or an output of an operator warning.

In another embodiment the object comprises a workpiece and/or a workpiece holder that are respectively to be measured, in particular a face plate, wherein the object is moved translationally or rotationally.

In particular, each of the re-determined parameters is stored in a parameter history and compared with the already stored parameters, in order to output the error message in the event of a deviation.

In this way, a long-term plausibility check can be carried out.

Furthermore, the aforementioned object is solved by a coordinate measuring machine comprising: a base; a sensor for measuring an object between various positions, wherein the object preferably is at least briefly at rest in each of the positions; a workpiece holder; a memory, where a parameter is storable, which is required for determining a kinetic energy of the object, which comprises the workpiece and the workpiece holder; and a controller, which is configured for carrying out the following steps: a) initially determining the parameter, and setting the initially determined parameter as target value; b) moving the object from one position to a next position, and re-determining the parameter for a movement cycle between the corresponding positions; c) setting the re-determined parameter as an actual value; d) comparing the target value with the actual value; e) continuing the movement of the object if the comparison results in that the actual value substantially coincides with the target value, and returning to the step b) as long as a last position has not been reached; or f) outputting an error message if the comparison results in that the actual value deviates significantly from the target value.

The control device may also be configured to carry out the method according to one of dependent claims.

It goes without saying that the aforementioned features and those yet to be explained below can be used not only in the combination specified in each case but also in other combinations or on their own, without departing from the scope of the present invention.

BRIEF DESCRIPTION OF THE DRAWINGS

Exemplary embodiments of the invention are illustrated in the drawing and will be explained in greater detail in the following description. In the figures.

DETAILED DESCRIPTION OF THE PREFERRED EMBODIMENTS

Figure 1A:
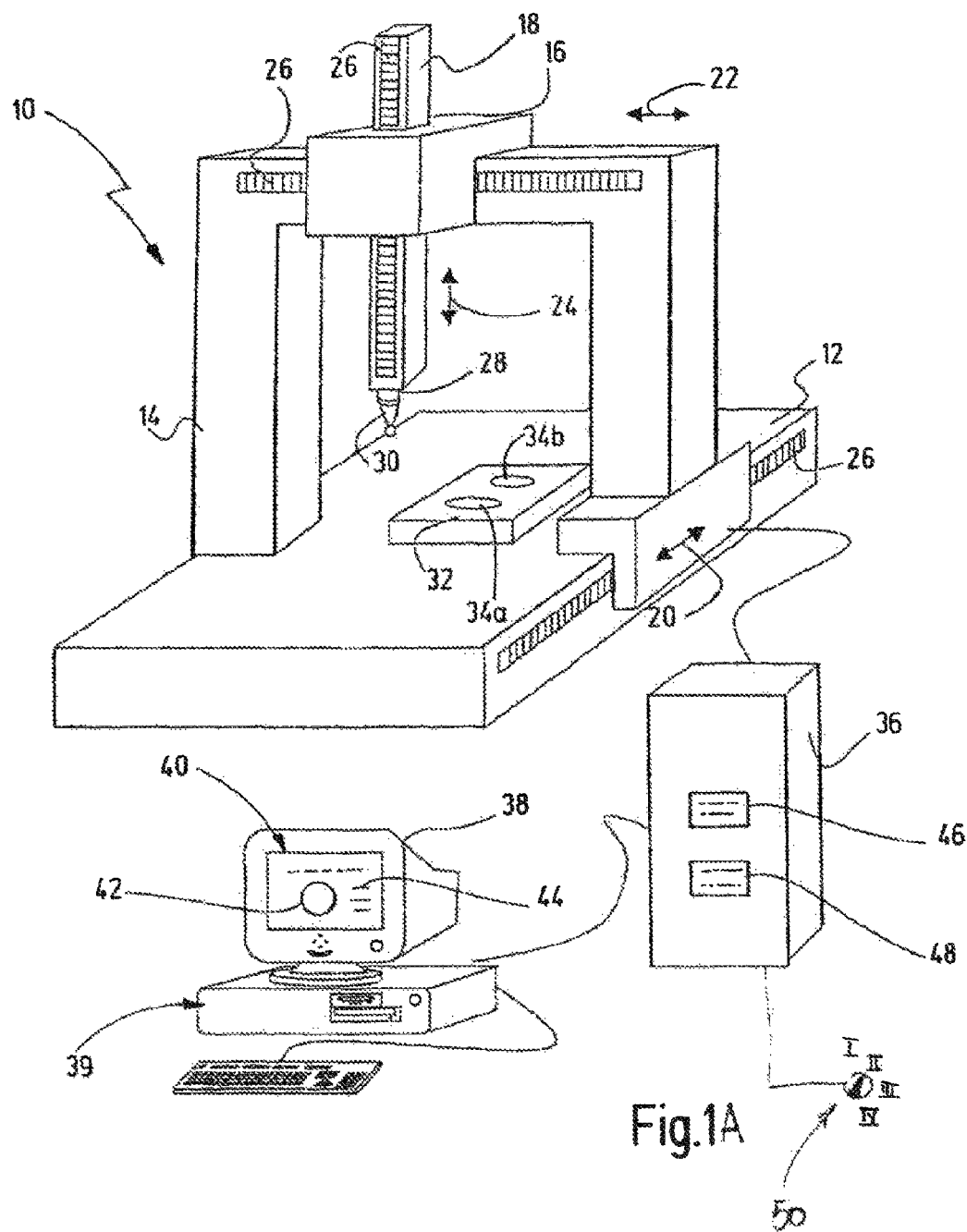
FIG. 1A shows a schematic structure of a coordinate measuring machine.

FIG. 1A shows a coordinate measuring machine 10 (also referred to hereinafter as "CMM 10" for short), which is shown by way of example in a portal design. In this case, the CMM 10 has a base 12, which is also referred to as a measuring table and is arranged on a portal 14. A crossbeam of the portal 14 supports a carriage 16, on which a quill 18 is arranged. The CMM 10 preferably has electric drives (not shown here), with which the portal 14 is movable in relation to the base 12 in the direction of an arrow 20. Furthermore, the carriage 16 can be moved on the portal 14 along an arrow 22. The quill 18 can be moved in relation to the carriage 16 in the direction of an arrow 24. Scales 26 are respectively arranged on the base 12, the portal 14, and the quill 18 and can be used as an aid for determining the current position of the portal 14, the carriage 16, and/or the quill 18. The arrows 20-24 define a machine-specific Cartesian coordinate system. The maximum deflections of the movable elements can define a measurement volume.

Arranged at a lower free end of the quill 18 is a probe head, or sensor, 28 which, for example, supports a stylus 30. The probe head 28 can be moved with the aid of the drives of the CMM 10 within the measurement volume that is defined by the movement axes of the portal 14, the carriage 16, and the quill 18. The stylus 30 serves for probing a workpiece 32, which is arranged on the base 12 of the CMM 10. The base 12 consequently serves here as a workpiece holder that is not designated any more specifically.

Figure 1B:
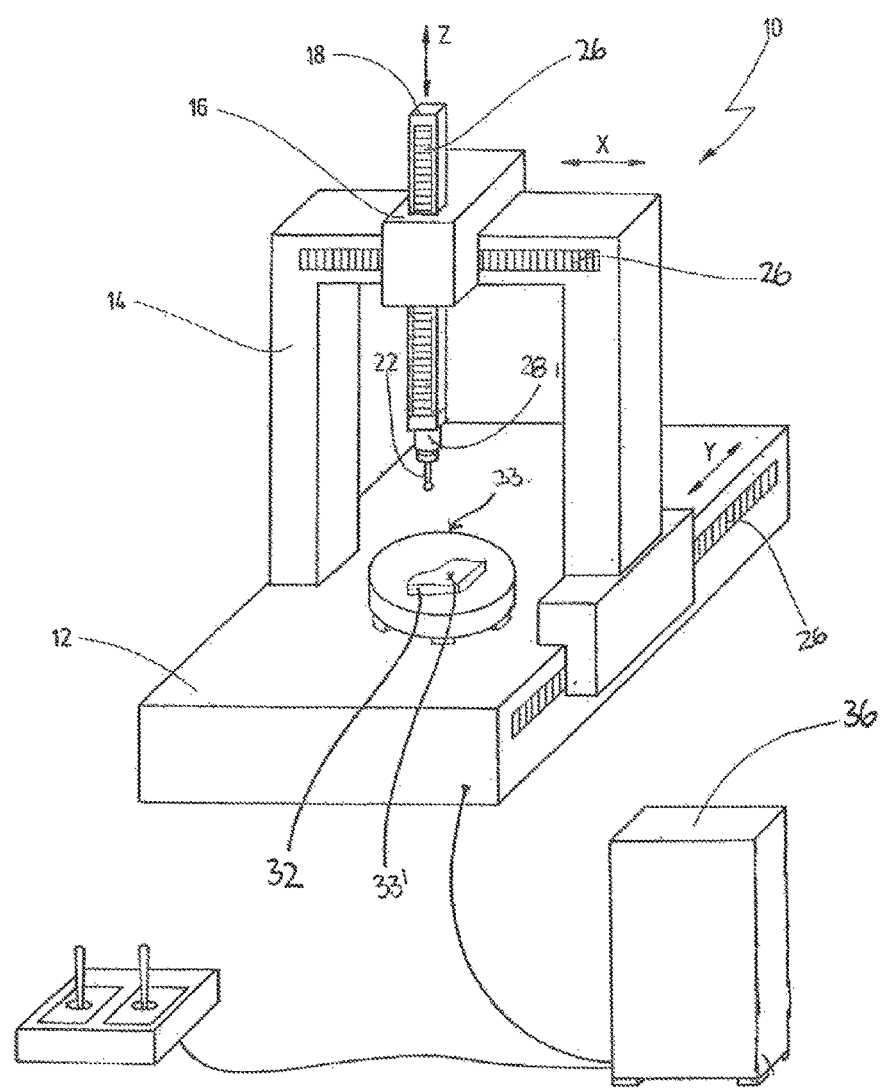
FIG. 1B shows a schematic structure of a coordinate measuring machine including a turntable.

The CMM 10 is shown here in the form of a typical example. The invention is not however restricted to coordinate measuring machines 10 of a portal design and can equally be used for measuring workpieces 32 in the case of coordinate measuring machines 10 of other designs, for instance in the case of coordinate measuring machines 10 of a horizontal-arm design. Furthermore, the CMM 10 may additionally have a so-called turntable 33 (FIG. 1B), which can be positioned on the base 12 in order to rotate the workpiece 32 between various measuring points about a 33'. In the built-in version, the turntable 33 is integrated into the base (measuring table) 12 (not shown). In the assembled version, the turntable 33 is portable and can be fastened on the base 12. With the turntable 33, the workpiece 32 can be positioned in any desired angular position. As a result, highly-accurate angular and radial measurements become possible. One particular application area for turntables 33 is the measuring of bodies of revolution, such as gearwheels, rotary parts, camshafts, and the like. Turntables 33 similarly make it easier to measure prismatic parts. The turntables 33 have the functions of holding, moving, and positioning the workpiece 32.

In spite of additional safety devices (for example, light arrays, pressure mats with a dead man's circuit, etc.), when using turntables 33, in particular it is not always possible with certainty to rule out the possibility of inattentiveness or improper handling leading to a situation where an operator (not shown) or the CMM 10 is at risk. For example, there is a risk of injury because of the rotational movement of the turntable 33. Parts of the body may be crushed or wrenched due to clothing being caught up. A further risk of injury is caused by an increased circumferential speed of a face plate of the turntable 33. If, for example, larger, i.e. heavier, face plates than those for which the turntable was originally set are used, the moment of inertia of the moved object (workpiece 32 plus face plate) increases so that the rotational speed must be adapted, to be specific must be reduced. An increase of the moment of inertia finally results in an increase of the kinetic energy ($E=½\ J\ w^{*}2$).

The workpiece 32 shown in FIG. 1A has, for example, two bores 34a and 34b, the position, shape, and diameter of which are to be measured with the aid of the CMM 10. The bores 34a and 34b represent typical geometric features of the workpiece 32 that can be measured with the aid of the coordinate measuring machine 10. Other geometric features may be cylindrical or non-cylindrical projections, pins, recesses, undercuts, edge lengths, or even a complex spatial shape such as the spatial shape of a turbine blade.

The CMM 10 also has a controller 36, which controls the drives of the CMM 10 and determines current positions of the portal 14, of the carriage 16, of the quill 18, and/or of the turntable (angular position). In many cases, the controller 36 is a programmable controller.

A computer 38, on which measurement, or evaluation, software 39 is executed, may also be provided. The software 39 evaluates the measurement signals, or values, supplied by the controller 36. The controller 36 produces in particular a measurement log 40, which here, by way of example, includes a measurement curve 42 and a numerical output of the measured values 44. The controller 36 and the computer 38 with the measurement, or evaluation, software 39 together form an evaluation and control unit.

In the exemplary embodiment of FIG. 1A, the controller 36 has a number of memories 46 and 48. There, measured values and parameters, such as drive currents, drive forces, the moment of inertia of a face plate and/or of the workpiece 32, can be stored. Furthermore, plans, in particular workpiece-specific test plans, can be stored there. A plan is distinguished by a sequence of approach positions, to which the workpiece 32 and/or the sensor 28 are moved, for example, for the purpose of a reference run. A test plan represents a sequence of multiple measuring positions that are visited by the CMM 10, by moving, for example, the portal 14 and/or the workpiece holder (for example, the turntable) correspondingly, and wherein the probe sensor 28 is brought into contact with the workpiece 32 for the purpose of carrying out a measurement.

The aforementioned risk of injury for the operator is proportional to the kinetic energy of the moved object. In case of translational movements, the kinetic energy is proportional to the product that is formed by the mass m of the moved object and the square of speed $v*2$. In case of a rotational movement, the kinetic energy is proportional to the product that is formed by the moment of inertia J and the square of the angular velocity $w*2$. In the following description, the invention is described by the example of a rotational movement. This means that the CMM 10 is operated with a turntable on which the workpiece 32 to be measured is clamped, and which has a face plate, which together form the object of which the moment of inertia J is to be determined in order to determine the rotational energy. Usually, the face plate is a separate component. In addition, a rotor may also be taken into account. Generally, each of the rotating components is relevant for the moment of inertia. It goes without saying that the following statements apply analogously to translational movements (for example, also to cross tables), where the workpiece 32 is, for example, mounted on a movably mounted workpiece holder. Furthermore, it goes without saying that, instead of the moment of inertia J, other safety-relevant parameters may also be considered, such as the speed v, or w, or a range of movement of the CMM 10. The speed v can be determined, for example, by way of the scale or scales 26 or change thereof.

According to the invention, the moment of inertia J is not only determined one single time at the beginning of a measurement. The moment of inertia J is determined repeatedly, preferably "continuously" or periodically. The moment of inertia is determined in particular during a movement of the object from one approach position to a next approach position, which is prescribed by the plan. The moment of inertia J may be determined on the basis of a profile of the current of a drive, in particular during a movement cycle. This means in other words that the moment of inertia J can be derived from the drive current. The drive current, or its profile, is measurable.

Figure 2A:
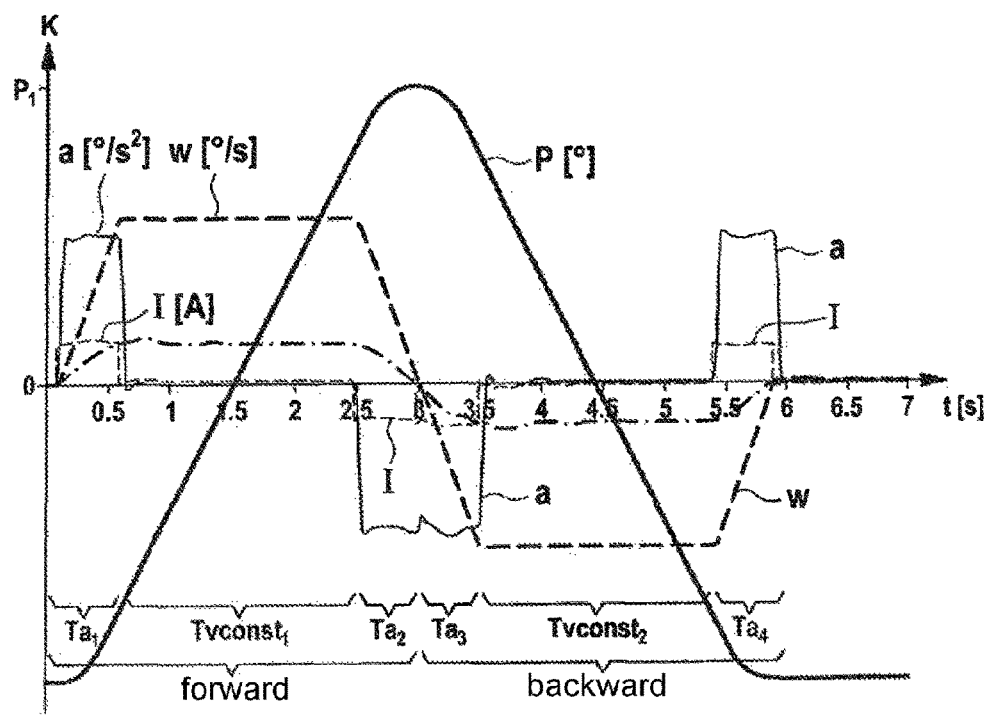
FIG. 2A shows the characteristic-time diagram without overshoots.
Figure 2B:
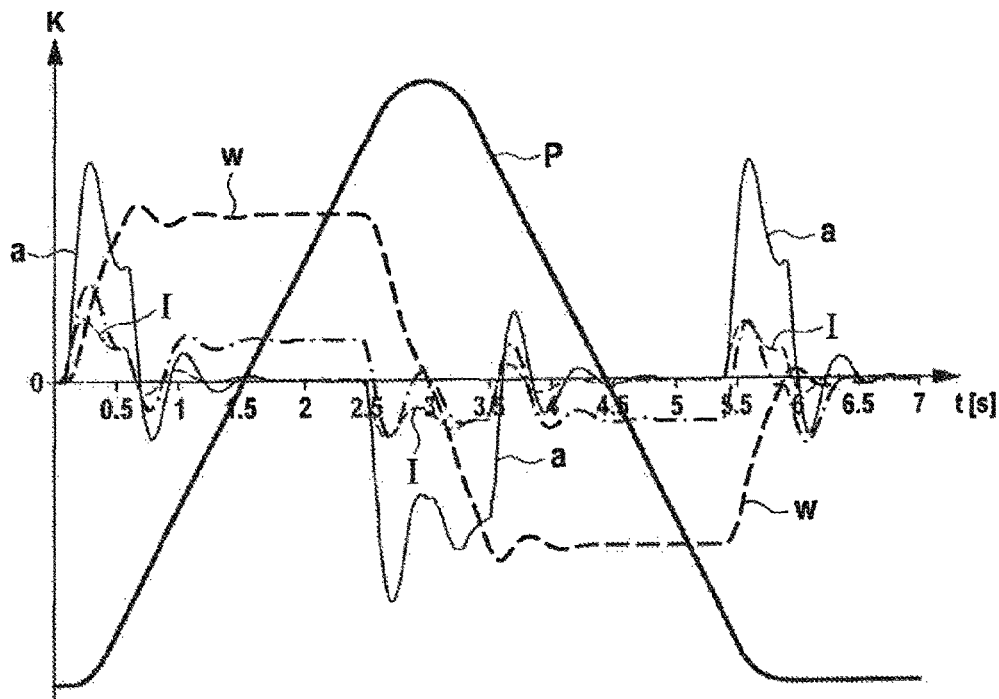
FIG. 2B shows the characteristic-time diagram with overshoots.

With reference to FIGS. 2A and 2B, characteristic-time diagrams that illustrate a rotational movement, which in turn is made up of two oppositely directed movements, are shown. FIG. 2A shows a profile of characteristics without overshoots. FIG. 2B shows a profile of characteristics including overshoots. The time t is plotted on the horizontal axis. The characteristics K are plotted on the vertical axis.

In FIG. 2A, a triangular curve P exemplarily illustrates an angular position of an axis of rotation, or of the rotating object, which is measured in the unit "degrees". A profile of an acceleration a is measured in the unit "degrees/s*2". During the "forward movement" of the axis of rotation, the angular position steadily increases up to a maximum (P1). Subsequently, the direction of movement is reversed (see "backward"), so that the angular position decreases. The acceleration a can be divided into a number of acceleration phases T. During the forward movement, the acceleration a increases very steeply (i.e. rapidly) from zero to a maximum value, which the acceleration a maintains during the first acceleration phase Ta1. The first acceleration phase Ta1 is followed by a phase Tvconst1, during which the acceleration is zero and during which the angular velocity w is constant. Shortly before the axis of rotation reaches its (desired) measuring position P1, the movement is slowed down. This takes place during the second acceleration phase Ta2, the second acceleration being directed opposite to the first acceleration of the first acceleration phase Ta1. In the measuring position P1, the angular velocity w is reduced to zero. A motor current I, which is measured in the unit "Ampère", relatively quickly assumes a first, almost constant, value during the first acceleration phase Ta1, while it is almost zero during the phase Tvconst1 because the object is already in rotation and this rotation merely has to be maintained. During the second acceleration, or slowing-down, phase Ta2 the motor must actively slow the rotation down, and therefore assumes an almost constant negative value. This motor current I can be measured, in particular during the acceleration phases Ta1 and Ta2. On the basis of these currents, the moment of inertia J of the rotating object can be calculated.

A right half of the curves shown in FIG. 2A indicates a "backward movement", where the axis of rotation is rotated back from the first measuring position P1 into its original position. Accordingly, the various curves P, a, w, and I follow a substantially analogous profile, but with the opposite sign in comparison to the forward movement.

The curve profiles shown in FIG. 2A are representative of a so-called "measuring run" of the CMM 10 (including the turntable). In a measuring run, the object is first rotated, for example, about 30° in the positive direction of rotation and then rotated back about 30° in the negative direction of rotation. A moment of inertia J can be respectively determined from the current intensity of the drive obtained during the acceleration phases Ta1, Ta2, Ta3, and Ta4, in particular by means of an average value of the current during the acceleration phases. These four values for the moment of inertia can in turn be used to determine an "initial" moment of inertia (consequently of a greater accuracy) for the object by averaging. With a measuring run, the moment of inertia can be initially determined, if it is not known or prescribed. The moment of inertia J may be used for determining the rotational energy ($E=\frac{1}{2} J w*2$), wherein it is possible to determine the angular velocity by means of a rotary transducer.

FIG. 2B shows the same sequence of movements as the curves of FIG. 2A (see in particular curve P). However, the acceleration a, the drive current I, and also the angular velocity w have "overshoots" in comparison to the corresponding profiles of FIG. 2A. In particular, the overshoots of the drive current I hinder the determination of the moment of inertia J, because, at least initially, the drive current I is not constant during the acceleration phases Ta. If the moment of inertia J is determined on the basis of these drive currents I, the calculated moment of inertia J is affected by errors, or is relatively inaccurate. This problem occurs in particular whenever the movements are for a relatively short time, i.e. the system cannot conduct transient oscillation. In this case, the object only covers relatively short distances between two adjacent measuring points P. This disadvantage can be reduced, however, by the averaging described above. Furthermore, with short movements, high speeds w cannot be reached either, so that the energy, the calculation of which includes the square of the speed, is in any case lower.

As soon as the moment of inertia J is (initially) known, an optionally provided switch 50 (compare FIG. 1) can be correspondingly pre-set. It generally applies that the setting of the switch can be performed independently of an initial determination of the moment of inertia. The switch 50 of FIG. 1 may for example assume four positions I, II, III, and IV. Each position represents a range for the moment of inertia, the ranges being divisible in any desired way and preferably starting at zero. The ranges I-IV cover in particular all moments of inertia that are expected or are permissible, which depends in particular on the mass and the mass distribution of the object, or of the workpiece 32. The switch 50 may be implemented by hardware (for example, mechanically) and/or by software. The switch 50 serves substantially for safety, as will be explained in still more detail below. The switch 50 provides a redundancy, which can be inquired "reliably". The range limits may be based on the objects that are being measured predominantly by the operator. If, for example, workpieces 32 with a moment of inertia J<2 kg/m$^2$ are predominantly being measured on the CMM 10, they may be moved with a speed of, for example, 90°/s. All other workpieces 32 above this limit (for example, mass moment of inertia >8 kgm*2) may then be moved, for example, at 30°/s (workpieces with a mass moment of inertia>20 kgm*2 would then be dangerous even at 30°/s). Which maximum speed is assigned to which switch position may be stored, for example, in a corresponding configuration file in the controller 36. To guard against manipulation, it is of advantage to protect this file by checksums.

Further redundancy can be realized by making an inquiry with the controller 26. For example, the operator uses a graphic user interface to input a value for the moment of inertia into the controller 36. The controller 36 indicates to the operator a value registered by the controller 36, and then queries whether the value understood is correct. The operator confirms the queried value, or corrects the value, whereby a renewed query is triggered.

It is also possible to configure the switch 50 in such a way that the (initial) moment of inertia J can be set not just in terms of a range but accurately, i.e. continuously. The switch 50 may be additionally protected by a software key or mechanical key in order to prevent manipulation by an unauthorized operator.

Figure 3:
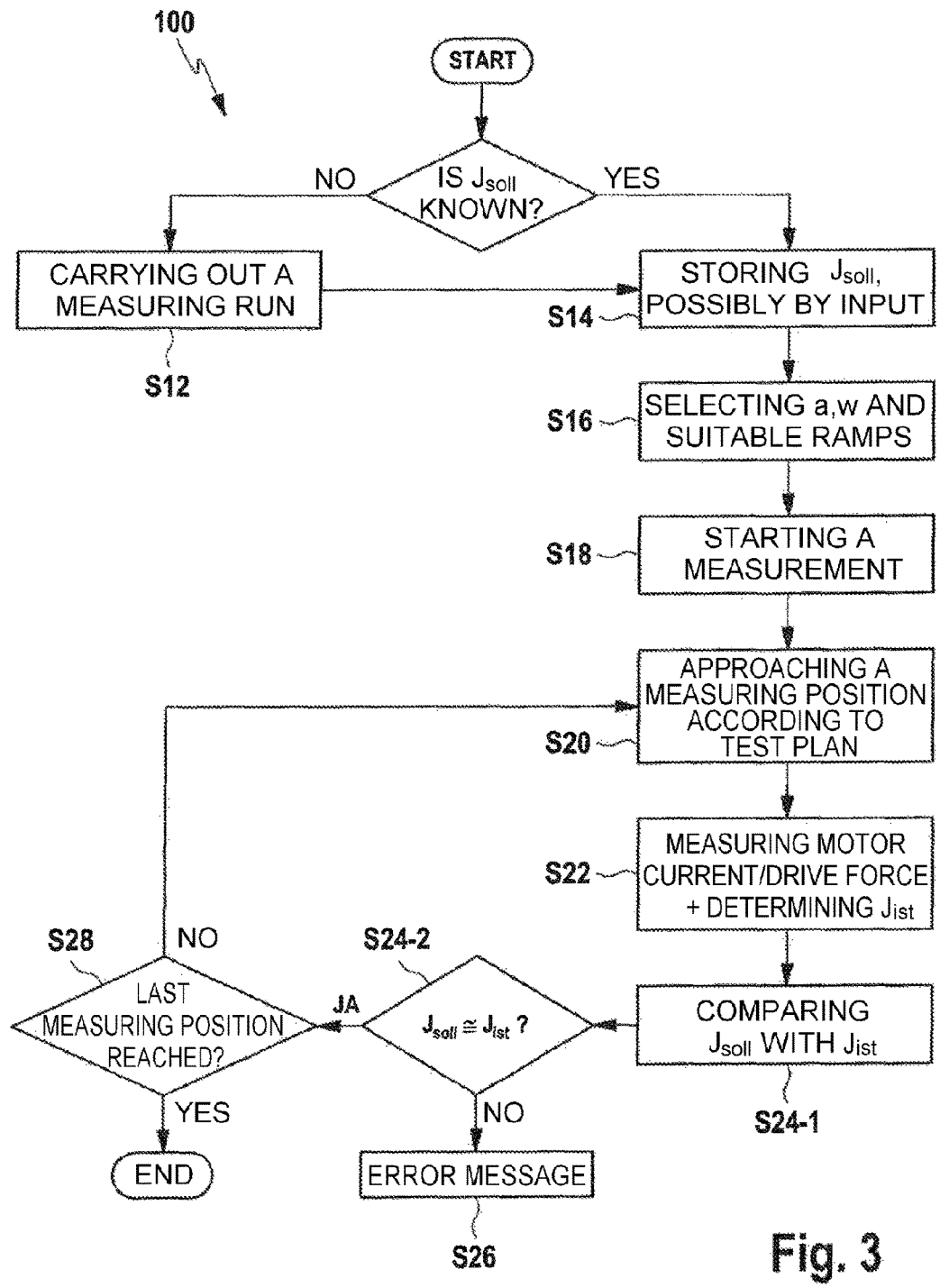
FIG. 3 shows a flow diagram of a method for monitoring a parameter.

With reference to FIG. 3, a method 100 for reliably monitoring a parameter that is included in the determination of the (kinetic or rotational) energy of the object is described below. This parameter is represented in particular by the mass m, or the moment of inertia J. If the mass m, or the moment of inertia J, changes considerably in comparison to a mass m, or a moment of inertia J, to which the CMM 10 has been initially set, the safety of the operator may be at risk. The following description is confined to the description of the parameter mass, or moment of inertia, but also applies analogously to other parameters, such as the speed or angular velocity.

Therefore, first an initial setting of the CMM 10 must be performed. For this purpose, in a step S10 it is inquired whether the moment of inertia J of the workpiece 32 to be measured (and also the moment of inertia J of the turntable or of the face plate) is known in advance. If the moment of inertia J is not known, in a step S12 the moment of inertia is determined, for example, by the measuring run described above. If initially neither a value is manually input nor a measuring run is performed, a measuring operation may be terminated with a corresponding output, in order to make the user carry out the initial determination (input or measuring run).

The measuring run may consist of a single movement or a number of movements back and forth. In FIG. 2A, a movement back and forth is shown, on the basis of which four (drive) current values I can be measured, which in turn are used for calculating the moment of inertia J, possibly while taking averagings into account, as described above. The moment of inertia J of the workpiece 32 to be measured (and also the moment of inertia J of the turntable, or of the face plate) may be known in advance, by being actively input by the operator or by being already stored as a fixed value in a plan, which the controller can offer to the operator for selection.

As soon as the (initial) moment of inertia J is either measured in step S12 or stored, for example, by the operator in the controller 36, a target value Jsoll for the moment of inertia is determined and set (step S14).

In an optional step S16, the controller 36, having knowledge of the initial moment of inertia Jsoll, may select an acceleration a and also an angular velocity w for each movement cycle between two approach positions, or measuring positions. In this case, the software 39 may set the profile (ramps) and the maximum values to be achieved of the acceleration a and the angular velocity w. After that, the actual measurement of the workpiece 32 can begin in a step S18. The measurement begins by the CMM approaching a first measuring position according to a corresponding plan, or test plan, (step S20). For this purpose, the turntable on which the workpiece 32 has been clamped may be rotated or moved into a corresponding angular position. It goes without saying that the description of FIGS. 3 applies not only to measurements according to test plans, but applies generally to plans according to which an object is moved between various positions, such as during a reference run. This also applies to the subsequent description.

During the corresponding movement, in a step S22 the motor current, or drive current, I and/or a drive force is measured, in particular during the acceleration phases Ta1 and Ta2. On the basis of these measurements, the actual moment of inertia Jist is then determined. Overshoots, as shown in FIG. 2B, can be suppressed, by optionally taking into account delay times, which are shown and explained more specifically here with the determination of the— preferably constant—drive current I. As an alternative to the drive current I, an acceleration could also be considered, i.e. an actual acceleration instead of an actual drive current. Furthermore, acceleration ramps would also be conceivable.

In a step S24, the target value Jsoll of the moment of inertia is then compared with the actual value of the moment of inertia Jist. This may take place, for example, by inquiring whether Jsoll corresponds substantially to Jist (step S24-2). Tolerances (e.g. ±5%) may be taken into account here. If the actual value Jist deviates significantly from the target value Jsoll, that is to say, for example, is outside the tolerance range, an error message is output in a step S26, as will be explained in still more detail below. If, however, the check results in that the target value Jsoll corresponds substantially to the actual value Jist, the measuring can be continued. For this purpose, in a step S28 it is inquired whether a last measuring position of the test plan has been reached. As soon as the last measuring position has been reached, the method 100 is complete, wherein it is possible to switch over to a so-called default mode, so that, for example, irrespective of its loading, the turntable does not move any faster than 30°/s, the upper limit still being monitored however. A corresponding default speed depends on this upper limit. As long as the last measuring position has not been reached, one returns to step 20, where a next measuring position is approached, following the current measuring position of the test plan. As already mentioned, the test plan should be understood as only given by way of example. A monitoring also takes place in case of movements of the coordinate measuring machine with a joystick, or in the case of other runs involving movement (for example, for warming up the coordinate measuring machine).

The error message output in step S26 may have the effect that the measurement is terminated. The error message may be have the effect that a current run command is interrupted immediately. The error message may have the effect that the speed is greatly reduced, because the speed includes the square of the energy. The error message may be used to warn or request the operator to check the measuring arrangement, in particular if a moment of inertia that is too small is determined.

The switch 50 shown in FIG. 1 and described above may be relevant for further safety inquiries, which are not shown in FIG. 3 and follow step S24-2. If it is established in the inquiry S24-2 that Jist matches Jsoll, it can be additionally inquired whether Jist is within the range for the moment of inertia defined by the switch position. If, for example, Jist is large and the switch position represents a small moment of inertia J, the switching-off described above likewise occurs. If, however, Jist is less than the moment of inertia J represented by the switch position, there is no risk to the operator, because the actual energy is lower than an expected energy. Nevertheless, the setup should be checked.

Furthermore, the routine described above for checking the plausibility may be used.

In a first case, it can be checked by comparison, for example, of the two drive currents that are obtained during the two acceleration phases (for example Ta1 and Ta2) of a simple movement (for example, forward movement) whether the current measuring device is operating correctly. In a further case, it can be checked whether the drive currents during a movement back and forth (forward and backward movement) are the same. In both cases, therefore, a comparison of values that are generated within a single movement cycle takes place. In addition, values that are generated during a number of movement cycles may be compared with one another. Also, values that originate from movement cycles that took place longer ago can be compared with one another. Furthermore, different sources of information may be compared with one another, such as a requirement prescribed by a test plan with a requirement prescribed by the user by means of the switch and the measurement on the basis of the current. By these measures, the measuring accuracy can be improved further. For this purpose, the measured values are stored in a history memory that is not shown and described any more specifically here.

The invention claimed is:

1. A method of operating a coordinate measuring machine having a movable workpiece holder for supporting an object to be measured by means of a sensor of the coordinate measuring machine while the object is moved by the workpiece holder between various positions and is at least briefly at rest in each of the positions, and controlling the movement of the object by monitoring a parameter which represents a moment of inertia or a mass required for determining the kinetic energy of the moving object, the method comprising the steps of:
   a) initially determining the parameter, and setting the initially determined parameter as target value;
   b) moving the object from one position to a next position, and re-determining the parameter for a movement cycle between the corresponding positions;
   c) setting the re-determined parameter as an actual value;
   d) comparing the target value with the actual value;
   e) continuing the movement of the object if the comparison results in the actual value substantially coinciding with the target value, and returning to step b) as long as a last position has not been reached; or
   f) outputting an error message if the comparison results in the actual value deviating significantly from the target value.

2. The method of claim 1, further comprising the steps of: selecting a parameter range, which comprises an expected parameter value, by an operator of the coordinate measuring machine from a plurality of parameter ranges before the step b) is carried out, an entirety of all the parameter ranges comprising each parameter value which is theoretically possible and permissible in practice.

3. The method of claim 2, wherein the selecting step is performed by actuating a selection switch of the coordinate measuring machine.

4. The method of claim 2, wherein the actual value is checked to determine whether it is within the selected parameter range, and wherein a further error message is output if the actual value is not within the selected parameter range.

5. The method of claim 1, wherein the determining of the parameter of at least one of the steps a) and b) comprises:
   measuring a drive current, or a drive force, during at least one of the acceleration phases of the movement cycle, the movement cycle comprising a phase with a positive acceleration and a phase with a negative acceleration; and
   determining the parameter based on the measured drive current, or based on the measured drive force.

6. The method of claim 5, wherein the drive current, or the drive force, for each of the acceleration phases of the movement cycle is measured, with the parameter determination being performed for each of the acceleration phases, the respectively determined parameter subsequently being averaged, and the corresponding average value representing the entire respective movement cycle.

7. The method of claim 5, wherein the drive current, or the drive force, for each of the acceleration phases of the movement cycle is measured, with the parameter determination being performed for each of the acceleration phases and the parameters which are respectively determined for the acceleration phases being compared with one another.

8. The method of claim 1, wherein the step a) is carried out by an operator inputting the target value into the coordinate measuring machine.

9. The method of claim 1, wherein the error message causes at least one of: an emergency shutdown of the coordinate measuring machine; an immediate termination of a current movement of the object; a reduction of a speed of movement; and an output of an operator warning.

10. The method of claim 1, wherein the object comprises at least one of a workpiece and a workpiece holder, which are to be measured respectively, and wherein the object is moved translationally or rotationally.

11. The method of claim 10, wherein the workpiece holder is a face plate.

12. The method of claim 1, wherein each of the re-determined parameters is stored in a parameter history and compared with the already stored parameters, in order to output the error message in the event of a deviation.

13. A coordinate measuring machine comprising:
a base;
a movable workpiece holder;
a sensor for sensing measuring points of an object to be measured, the object being moved via the workpiece holder between various positions, wherein the object is at least briefly at rest in each of the positions;
a memory where a parameter, which is a moment of inertia, or a mass, and represents a measure of a kinetic energy of the moving object, is storable; and
a controller, which is configured to control the movement of the object by carrying out the following steps:
a) initially determining the parameter, and setting the initially determined parameter as target value;
b) moving the object from one position to a next position, and re-determining the parameter for a movement cycle between the corresponding positions;
c) setting the re-determined parameter as an actual value;
d) comparing the target value with the actual value;
e) continuing the movement of the object if the comparison results in that the actual value substantially coincides with the target value, and returning to the step b) as long as a last position has not been reached; or
f) outputting an error message if the comparison results in that the actual value deviates significantly from the target value.

* * * * *